July 11, 1950 J. F. KIMBALL 2,514,548
TONE ARM ACTUATOR
Filed Dec. 29, 1948 2 Sheets-Sheet 1
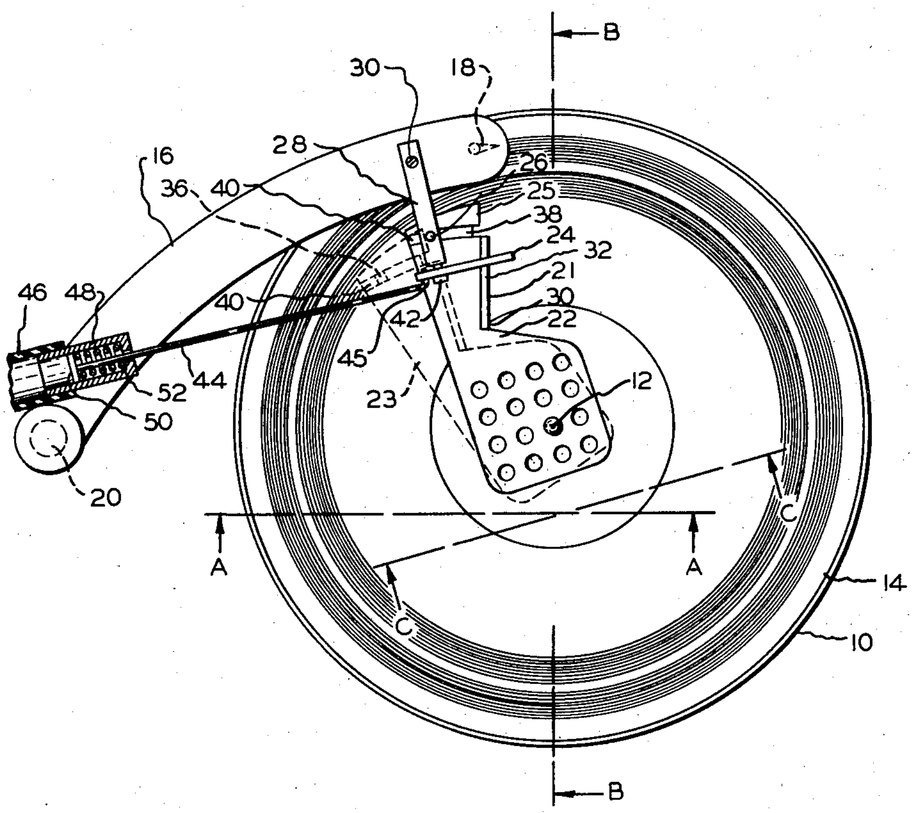
FIG. I
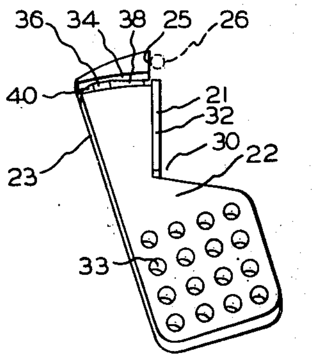
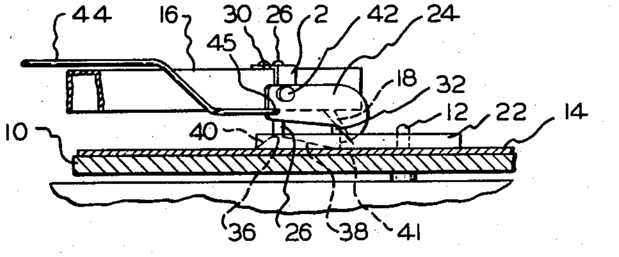
FIG. II
FIG. III
Inventor
JAMES F. KIMBALL
By Beeman & Patch July 11, 1950 J. F. KIMBALL 2,514,548
TONE ARM ACTUATOR
Filed Dec. 29, 1948 2 Sheets-Sheet 2
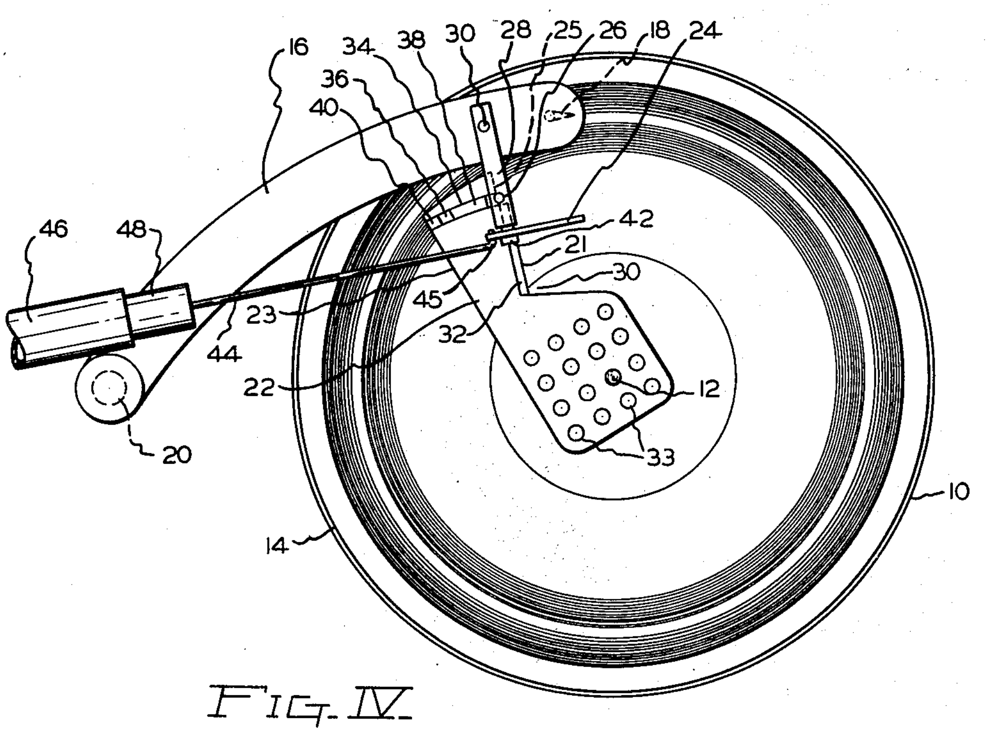
FIG. IV.
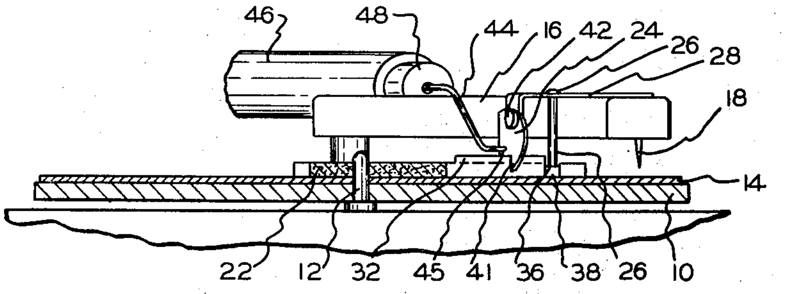
FIG. V.
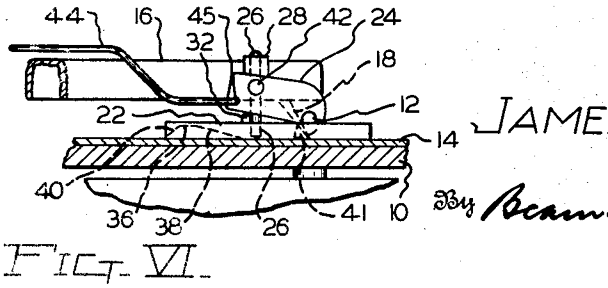
FIG. VI.
Inventor
JAMES F. KIMBALL
By Beaman & Patch.

Patented July 11, 1950

2,514,548

UNITED STATES PATENT OFFICE 2,514,548

TONE ARM ACTUATOR

James F. Kimball, Jackson, Mich.

Application December 29, 1948, Serial No. 67,949

6 Claims. (Cl. 274—1)

This invention relates to phonographs and has for one of its principal objects the adaptation of a phonograph for advertising purposes.

It is a particular object of the invention to adapt a phonograph for use at a gasoline filling station to automatically play some advertising ditty, slogan or announcement when a vehicle approaches the station. Obviously, however, the thus adapted phonograph can be installed for use in other locations than a gasoline filling station.

A further object of the invention is to provide a phonograph accessory adapted automatically to cause the tone arm needle to engage with a record to play a pre-selected portion thereof, whereupon the tone arm is automatically raised to remove the needle from playing engagement with the record.

Yet a further and important object of the invention is to provide an advertising apparatus, for installation at a gasoline filling station or like location, which employs a phonograph having an electronic tube amplifier and a tone arm actuator mechanism adapted to be influenced by the action of an approaching car or other vehicle to cause the tone arm needle to make playing contact with a record, whereby when the amplifier tubes are heated and the phonograph turntable is in motion the record, or a pre-selected portion thereof, is automatically played under the control of the approaching vehicle.

A further and specific object of the invention is to provide an accessory for a phonograph comprising an abutment plate member adapted to rest lightly upon a record positioned for playing and to be held against rotation with the record in position where the abutment plate is operable to effect a lowering or raising of the tone arm needle with respect to the record sound track under the control of a latch and actuator means for the latter, the latch normally engaging the abutment plate to hold the same against rotation, with the tone arm needle held raised from engagement with the record, and the latch actuator means being adapted for remote actuation, as by a vehicle approaching a gasoline filling station, to permit the abutment plate to rotate with the record and thereby automatically lower the tone arm needle into the record playing position.

These and other objects and advantages of the invention, and the realization thereof, will appear clear from a consideration of the following specification and claims in conjunction with the accompanying drawings in which:

Fig. I is a plan view of one embodiment of the invention, with the tone arm actuator abutment plate and associated parts shown in the full line non-playing position which they normally occupy prior to disengagement of the latch to free the abutment plate for rotation with the record, the dotted position of the abutment plate corresponding to the position this plate occupies upon making a complete revolution with the record and just prior to its re-engagement by the tone arm stop pin to again lift the tone arm needle from playing engagement with the record sound track, Fig. II is a section on the line A—A of Fig. I, Fig. III is a plan view of the abutment plate employed in this embodiment of the invention and showing in dotted lines the position which the tone arm stop pin occupies to arrest rotation of the abutment plate with the record after having been freed by the latch to rotate with the record and prior to the positioning of the stop pin, due to continued playing of the record, opposite the re-entry end of the camtrack guide channel in the face of the abutment plate, Fig. IV is a similar view to Fig. I, but showing the position of the parts when the tone arm stop pin is about to re-enter the aforesaid guide channel, Fig. V is a section on the line B—B of Fig. I, and Fig. VI is a section on the line C—C of Fig. I but showing the parts in position where the tone arm needle has playing engagement with the record sound track and the abutment plate is held arrested by engagement of the tone arm stop pin with the abutment plate as indicated in Fig. III.

Referring to the drawings 10 indicates the rotary turntable of a phonograph having the usual central upstanding pin 12, which guidingly supports a record 14 for rotation with the table 10, and 16 indicates the usual phonograph tone arm having a playing needle 18 and swingably mounted at 20.

The phonograph itself may be of well-known and usual construction, including the turntable and tone arm, and is of the type which has an electronic tube amplifier (not shown).

Supported upon the record 14 there is an elongated plate member 22 which constitutes an abutment plate, as will be explained later, for a latch 24 and for a depending stop pin 26 on a bracket arm 28 rigidly connected with the tone arm 16, as by screw 30.

The abutment plate 22 (which may be formed from plastic material) is adapted to rest lightly upon the record and is normally held against rotation with the record by the engagement of the latch 24 with the rear side 21 of the abutment plate, having regard to the direction of rotation of the record, as indicated by the arrow. Said side 21 of the abutment plate is shown cut away to provide an angular recess 30 having an upstanding flange 32 along one side limb thereof, which flange forms an effective abutment for the latch 24.

The abutment plate is also shown provided with a series of holes 33 in any one of which the rotatable turntable pin 12 can be selectively engaged so as thereby to adjust the abutment plate with respect to the record and to the sound track thereon.

At its outer end, having regard to its operative position upon the record, the abutment plate is formed in its upper surface with a transversely extending guide channel 34 open to both sides of the abutment plate and eccentric to the turntable pin 12, said channel being formed to receive the depending tone arm stop pin 26. The base of this guide channel is formed to provide a double cam track separated by an elevation 36 and constituted by a relatively long and gradually inclined track 38, open at its outer end to the abutment plate side 21, and a relatively short and steeply inclined track 40, opening at its outer end to the opposite side 23 of the abutment plate. At its extreme outer end, and on the said rear side 21, the abutment plate has an effective abutment edge 25, the purpose of which will be described later.

The latch 24 is pivotally mounted, at 42, upon the bracket arm 28 and has a hook nose portion 41 by which it abuttingly engages the flange 32 on the abutment plate 22 when so positioned, and as shown in Figs. II and V.

The latch 24 is also connected by a link 44 (which latter constitutes a latch actuator) to a flexible air tube 46 having a nozzle piece 48 forming a guide for an interior piston 50 (Fig. I) carried by said link for reciprocation within said nozzle piece against the action of the coil spring 52, which latter normally acts to urge the piston to the left, as seen in Fig. I, in which position the latch 24, through the medium of the link 44 (the latter being guided through the end opening 43 in the nozzle piece and being swivel connected at 45 with the latch) is tensioned into latching engagement with the abutment plate flange 32.

Assuming that the phonograph with the accessory structure above described is located at a gasoline filling station, that the record 14 contains an advertising ditty sound track, that the amplifier tubes are heated and the turntable 10 is rotating, that the air tube 46 extends to ground level and is laid in the path of the cars or other vehicles which approach the filling station and further, that the accessory parts are in the full line position shown in Fig. I, with the stop pin located upon the elevation 36, and the tone arm 16 and needle 18 accordingly held in the elevated non-playing position as seen in Fig. IV, the operation is as follows:

Upon a car or vehicle passing over the air tube 46, the air therein is compressed and causes the piston 50 to be moved to the right, against the action of the spring 52. This movement causes the link 44 to actuate the latch 24 to swing the latter about its pivot 42 in such manner (as will be appreciated from consideration of Fig. VI) as to lift the latch nose 41 from engagement with the abutment plate flange 32. This automatically frees the abutment plate 22 to rotate with the record 14 and is first accompanied by a lowering movement of the stop pin 26 down the sharply inclined track 40 of the channel 34 and by a slight radially outward movement of the tone arm 16 corresponding to the eccentricity of the guide channel 34. The construction and arrangement is such that at the time when the abutment plate, in its rotary movement with the record 14, leaves the stop pin 26 the tone arm needle 18 will have been lowered into playing contact with the record and in position, with respect to the sound track, as causes the required advertising ditty to be played and the point of commencement of which is capable of being pre-selected and adjusted by engagement of the appropriate hole 33 in the abutment plate with the turntable spindle 12.

After making one complete revolution with the record 14 the abutment plate will again be brought to rest but this time by the engagement of the abutment edge 25 of the abutment plate with the stop pin 26, as indicated in dotted lines in Fig. III. In this position of the parts (as seen also in Fig. VI) the record will continue to be played until the tone arm stop pin 26, as indicated in Fig. IV, is positioned opposite the reentry end of the guide channel 34. When so located, and with the phonograph turntable still rotating of course, the tone arm stop pin is free to ride up the cam track portion 38 since the abutment plate is now free to be taken round with the rotating record and returned from its dotted position, as seen in Fig. I, to its original and full line position as shown in Figs. I, II and V.

As the tone arm stop pin 26 rides up the cam track portion 38 the needle 18 is lifted from engagement with the record 14 until the position is reached when the stop pin is again engaged with the elevation 36. Simultaneously with this occurring the latch 24, biased by its spring 52, will have re-engaged the abutment plate flange 32 to arrest further rotation of the abutment plate and thereby hold the parts positioned for a fresh operational cycle upon the air tube 46 being again actuated by the passing of a vehicle thereover.

While it is proposed that the phonograph amplifier tubes should be continuously "hot" and that the record table should be continuously rotating obviously this could be modified and arrangement made, as by suitable switches, for the phonograph to be brought into playing operation automatically in the manner above described and ultimately cut-off from playing, as when a particular advertising announcement has been completed or a particular time interval has elapsed.

Having thus described one practical form and application of the invention but without limiting the same to the precise constructional details and the arrangement disclosed thereby what I claim is as follows:

1. In combination with a phonograph, tone arm abutment means adapted to be supported by a record positioned for playing, said means being rotatable with the record, stop means operatively associated with the phonograph tone arm and adapted to contact said abutment means to lower the tone arm needle into playing engagement with the record and ultimately to raise it from such playing engagement, latch means operatively associated with said abutment means and adapted to arrest movement of the latter with the phonograph record, and latch actuator means operatively connected with said latch means and adapted to release the latter to free the said abutment means for movement with the record to thereby automatically move the needle into and out of playing engagement.

2. The combination as claimed in claim 1, said latch actuator means comprising a flexible fluid line connected with the latch and adapted and arranged to effect disengagement of the latch by displacement of the fluid therein.

3. In combination with a phonograph, stop means operatively associated with the phonograph tone arm, an abutment member for said stop means, said abutment member being positioned for rotation with a record in playing position on the phonograph turntable, an abutment surface on said abutment member, latch means adapted to hold the latter is position in which said tone arm stop means supports the tone arm needle out of playing engagement with the record, and latch actuator means operable to disengage the latch from said abutment holding position and thereby free the tone arm needle to enter automatically into playing engagement with the record.

4. The combination as claimed in claim 3 said abutment being in the form of a plate adapted to rest lightly upon the record for rotation with the latter when freed by disengagement of said latch.

5. The combination as claimed in claim 3 said abutment means including a guide track for engagement by said tone arm stop means to control lowering and raising movements of the tone arm needle into and out of playing engagement, said guide track having an exit end for said stop means and a re-entry end therefor and including an abutment surface for said tone arm stop means corresponding to a position at which the tone arm needle is held in the non-playing position.

6. Advertising apparatus comprising in combination, a phonograph, a record on the phonograph turntable, abutment means supported upon said record for rotation therewith, a latch device adapted normally to hold said abutment means against rotation with the record, stop means associated with the phonograph tone arm and normally contacting said abutment means in position to hold the tone arm needle out of playing position with respect to said record, and remote control means operatively associated with said latch device and adapted upon actuation to release the latch device from rotary restraining engagement with said abutment means so as thereby to permit the tone arm needle to enter automatically into playing engagement with said record.

JAMES F. KIMBALL.

REFERENCES CITED

The following references are of record in the file of this patent:

UNITED STATES PATENTS

| Number | Name | Date |
|---|---|---|
| 1,643,369 | Bookman | Sept. 27, 1927 |

FOREIGN PATENTS

| Number | Country | Date |
|---|---|---|
| 249,872 | Germany | Aug. 1, 1912 |